(12) United States Patent
Zhang et al.

(10) Patent No.: US 7,492,138 B2
(45) Date of Patent: Feb. 17, 2009

(54) SYNCHRONOUS RECTIFIER CIRCUITS AND METHOD FOR UTILIZING COMMON SOURCE INDUCTANCE OF THE SYNCHRONOUS FET

(75) Inventors: Jason Zhang, Monterey Park, CA (US); Bo Yang, San Diego, CA (US)

(73) Assignee: International Rectifier Corporation, El Segundo, CA (US)

( * ) Notice: Subject to any disclaimer, the term of this patent is extended or adjusted under 35 U.S.C. 154(b) by 286 days.

(21) Appl. No.: 11/096,929

(22) Filed: Apr. 1, 2005

(65) Prior Publication Data

US 2005/0265057 A1      Dec. 1, 2005

Related U.S. Application Data

(60) Provisional application No. 60/560,297, filed on Apr. 6, 2004, provisional application No. 60/600,160, filed on Aug. 9, 2004.

(51) Int. Cl.
*G05F 1/00* (2006.01)
*H02M 3/335* (2006.01)

(52) U.S. Cl. ............... 323/282; 323/224; 363/21.06; 363/21.14; 363/127

(58) Field of Classification Search ............ 323/224, 323/282, 284; 363/21.06, 21.14, 127
See application file for complete search history.

(56) References Cited

U.S. PATENT DOCUMENTS 6,249,156 B1 *  6/2001  Attwood ............... 327/110
6,541,948 B1 *  4/2003  Wong .................. 323/284
6,577,518 B2 *  6/2003  Abdoulin .............. 363/127
7,075,276 B2 *  7/2006  Morales ................ 323/246
2002/0175661 A1 * 11/2002  Wheeler et al. ......... 323/282
2004/0109335 A1 *  6/2004  Gan et al. ............. 363/127
2006/0226819 A1 * 10/2006  Xu et al. .............. 323/268

OTHER PUBLICATIONS

Choosing the Right MOSFET Package, by Jason Zhang, Feb. 9, 2004.*

* cited by examiner

*Primary Examiner*—Akm E Ullah
*Assistant Examiner*—Ramy Ramadan
(74) *Attorney, Agent, or Firm*—Ostrolenk, Faber, Gerb & Soffen, LLP

(57) ABSTRACT

A method of improving the operation of a synchronous rectifier circuit which includes a switching transistor and synchronous transistor, by providing an operatively effective value of inductance in the current path of the synchronous transistor; which is shared by the control terminal circuit path of the transistor and by selecting a synchronous transistor having a low resistance to a control signal provided at the control terminal, as well as improved synchronous rectifier circuits designed according to the method. When the transistors are MOSFETs, the inductance provided is preferably a purely parasitic common source inductance in the range of about 2 nH to about 3 nH. The synchronous transistor exhibits a low value of gate resistance to facilitate fast energy exchange between the common source inductance and the gate-source capacitance.

17 Claims, 6 Drawing Sheets

SYNCHRONOUS RECTIFIER CIRCUITS AND METHOD FOR UTILIZING COMMON SOURCE INDUCTANCE OF THE SYNCHRONOUS FET

CROSS-REFERENCE TO RELATED APPLICATIONS

This application is based on and claims priority to U.S. Provisional Application No. 60/560,297, filed Apr. 6, 2004, and U.S. Provisional Application No. 60/600,160, filed Aug. 9, 2004, the entire disclosures of which are incorporated herein by reference.

BACKGROUND OF THE INVENTION

1. Technical Field of the Invention

The present invention relates to synchronous rectifier circuits. More particularly, the invention relates to synchronous rectifier circuits in which a parasitic inductance associated with the synchronous transistor is utilized to yield significant improvements in circuit operation. Synchronous rectifier circuits designed according to the present invention exhibit minimal dead time, shoot through prevention and Cdv/dt immunity, as well as significant switching loss reduction. The principles of the invention are applicable to all types of synchronous rectifier topology, and to implementation using MOSFETs as well as IGBTs and other types of transistors.

2. Relevant Art

With advances in VLSI technology, digital systems now require lower supply voltage and higher current. Low output voltage and high output current DC/DC converter are widely used to power those systems. Synchronous rectifiers are essential technology for these applications because of the greatly reduced conduction loss compared with diode rectifiers, for example.

For purposes of the description herein, it is to be understood that the synchronous transistor is one which replaces or supplements the diode function.

FIGS. 1(a) and 1(b) show two examples of synchronous rectifier circuits. FIG. 1(a) shows a buck converter including a high side power switching MOSFET Q1 and a low side synchronous MOSFET Q2. The common node between Q1 and Q2 feeds a load $R_o$ through a series inductor $L_o$ and a parallel capacitor $C_o$.

FIG. 1(b) shows an isolated half bridge converter in which a pair of power switching MOSFETs Qp1 and Qp2 drive the primary of a transformer 10. A pair of synchronous MOSFETs Q1 and Q2 connected to the high and low sides of a center tapped secondary of transformer 10 and to a common node 12 again feed a load $R_o$ through a series inductor $L_o$ and a parallel capacitor $C_o$.

In both instances, gate drive for the MOSFETs is provided by a pulse width modulated signal, the duty cycle of which is controlled by a feedback loop (not shown) to provide the desired output current and voltage.

For convenience, the invention will be described mainly in the context of the buck converter topology using MOSFETs, but it has been found that the benefits of the invention are directly applicable to other synchronous rectifier topologies as well, and to circuits using other types of transistors.

In a circuit employing MOSFETs, the parasitic inductance of interest is the common source inductance shared by the drain-source current path and gate driver loop as shown in FIG. 2. The common source inductance $L_{CSI}$ carries the drain source current and the gate charging current. Any voltage induced on $L_{CSI}$ contributes to the $V_{GS}$ of the MOSFET. Because of the importance of $V_{GS}$ on the switching performance of a power MOSFET, common source inductance has very significant impact on the system performance. This is well known to those skilled in the art, and according to conventional practice, great care is taken in circuit layout to reduce common source inductance to as low a value as possible for both the switching and synchronous transistors in synchronous rectifier circuits.

More particularly, because the drain source current of a power MOSFET flows through $L_{CSI}$, and $L_{CSI}$ is also in the gate driver loop, a change of the drain source current induces a voltage across common source inductance $L_{CSI}$. This voltage actively modifies the gate source voltage of a power MOSFET. The effect is particularly significant during turn on and turn off when $I_{DS}$ and $V_{GS}$ make fast transitions.

FIG. 3(a) shows the effect of common source inductance during turn on for a power MOSFET $Q_1$ used as an active switch on the high side. When voltage is applied to turn on $Q_1$, the voltage induced on $L_{CSI}$ due to the rising current acts against $V_{GS}$. This slows down the turn on of the MOSFET. The same effect in the opposite direction can be observed during turn off of Q1 in FIG. 3(b). Simulation studies of a conventionally designed synchronous buck converter circuit having a 12V input and providing a 30 A output at 1.3V with a gate drive switching frequency of 500 kHz (a typical application), indicate that the presence of common source inductance of even 1 nH can result in a power loss of about 6 W.

SUMMARY OF THE INVENTION

Contrary to conventional understanding and practice, it has been found that permitting the presence of parasitic inductance in the circuit of the synchronous transistor of a synchronous rectifier circuit provides unexpected and significant benefits in the overall performance of the device.

In particular, according to the invention, in a MOSFET implementation, a method of improving the performance of a synchronous rectifier circuit comprises permitting a level of common source inductance shared by the main current path of the synchronous MOSFET and the gate charging circuit which is normally eliminated in the circuit layout according to conventional practice, while minimizing the gate resistance of the synchronous MOSFET to permit fast energy exchange between the gate to source parasitic capacitance, and the permitted common source inductance.

More generally according to the invention, a method of improving the performance of a synchronous rectifier circuit comprises permitting a level of parasitic inductance which is shared by the main power path of the synchronous transistor and the circuit path for the transistor control terminal while minimizing the resistance to a control signal at the transistor control terminal.

Synchronous rectifier circuits of all topologies designed according to this principle exhibit minimal dead time, shoot through prevention and improved Cdv/dt immunity, as well as significant switching loss reduction. For example, a buck converter having a self-driven synchronous MOSFET, and isolated synchronous rectifier circuits can be designed according to the principles of the invention. Other variations are described below.

Also according to the invention, the benefits can generally be achieved utilizing only parasitic inductance without the need for additional magnetic elements, which is particularly advantageous in integrated circuits. On the other hand, a separate inductive element could be employed if desired, or needed.

Accordingly, it is a general object of this invention to provide improved synchronous rectifier circuits by taking advantage of certain unexpected benefits which result from permitting the presence of parasitic inductance in the current path of the synchronous transistor.

It is a more specific object of this invention to provide improved MOSFET synchronous rectifier circuits by taking advantage of certain unexpected benefits which result from permitting the presence of common source inductance in the current path of the synchronous MOSFET.

It is a further object of this invention to provide a method of improving the performance of synchronous rectifier circuits which involves taking advantage of these unexpected benefits.

Other objects of the invention, as well as other features and advantages thereof will become apparent from the following description which refers to the accompanying drawings.

DETAILED DESCRIPTION OF PREFERRED EMBODIMENTS OF THE INVENTION

FIGS. 4(a)-4(d) illustrate the basic concepts of the method and apparatus of the invention in the exemplary context of a MOSFET buck converter.

Figure 1A:
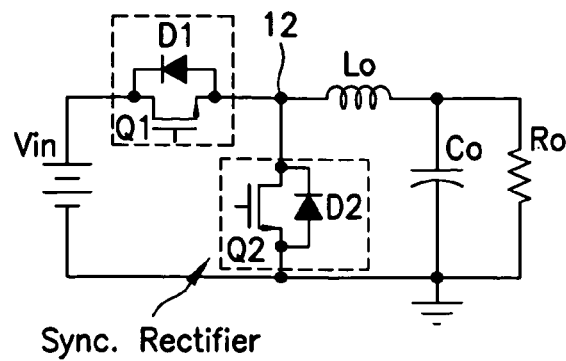
FIGS. 1(a) and 1(b) illustrate conventional synchronous rectifier topologies.
Figure 1B:
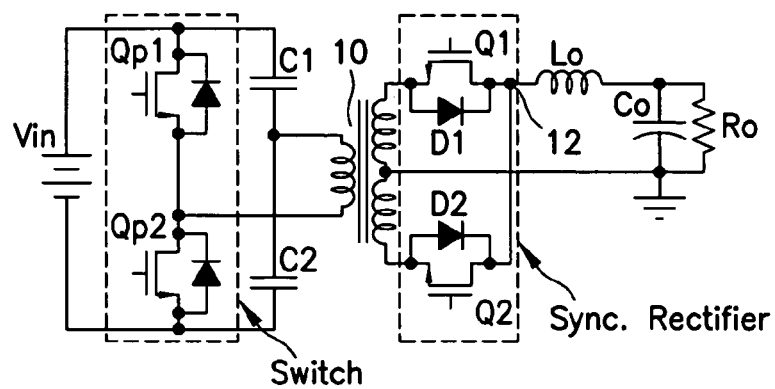
Figure 2:
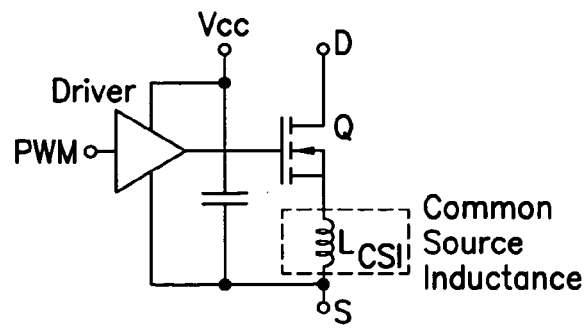
FIG. 2 shows the effect of common source inductance in a MOSFET circuit.
Figure 3A:
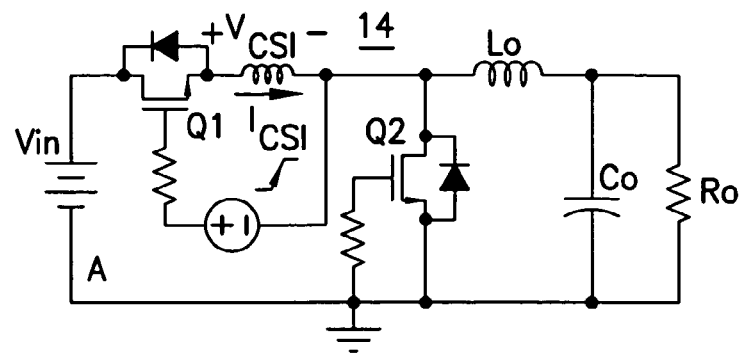
FIGS. 3(a) and 3(b) show further details concerning the effect of common source inductance on the turn on and turn off of a MOSFET used as the high side switch in a synchronous rectifier circuit.
Figure 3B:
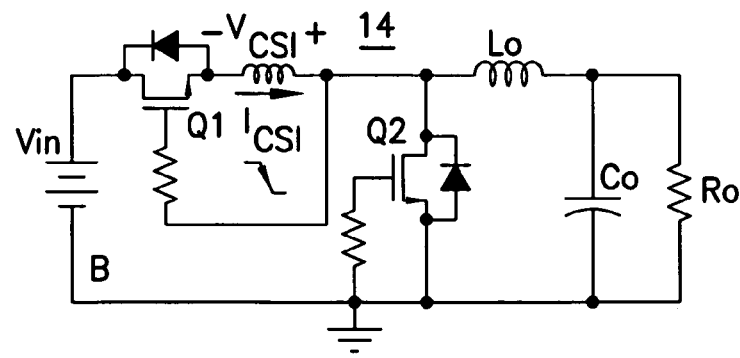
Figure 4A:
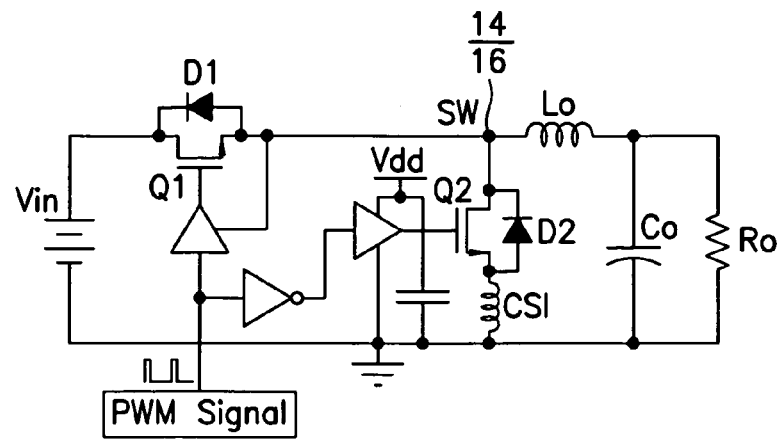
FIGS. 4(a) through 4(d) illustrate the application of the present invention to the design of a buck converter.
Figure 4B:
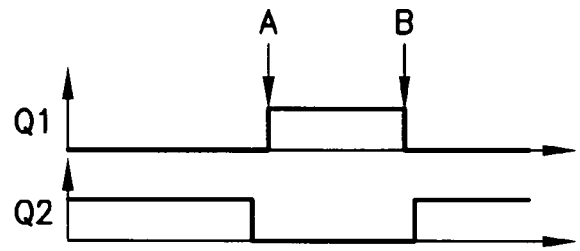

In a synchronous rectifier having buck converter topology, the synchronous or low side MOSFET is used as a diode. The current direction is from source to drain, opposite to that in the high side MOSFET. Because of this difference, the effect of a common source inductance on the switching action is also opposite. FIGS. 4(a) and 4(b) show the impact of common source inductance on the low side MOSFET Q2 during turn on and turn off of the high side MOSFET Q1 in a synchronous rectifier circuit 14 having buck converter topology. Since Q2 is the synchronous MOSFET, its gate signal doesn't change the operation mode of converter 14 because of the existence of body diode D2 and dead time. The time when common source inductance affects the operation of the circuit are at the turn on and turn off times A and B of control FET Q1 (see FIG. 4b).

Figures 4C, 4D:
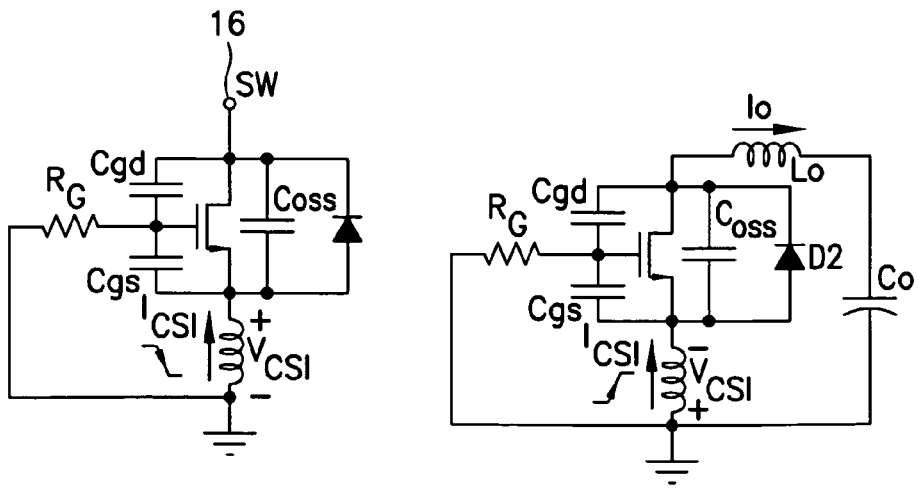

FIG. 4(c) shows the circuit of time A of Q2 when Q1 is turned on. Q2 has been turned off before time A and its gate is treated as being grounded. At time A, load current will commute from Q2 body diode D2 to Q1. As current in diode D2 decreases, a voltage $V_{CSI}$ with polarity shown in FIG. 4(c) is induced on the common source inductance. The voltage in gate loop of Q2 charges $V_{GS2}$ to a negative value, which drives Q2 further into the off state. This helps the circuit to prevent shoot through or Cdv/dt sensitivity as discussed next.

FIG. 4(d) shows a diagram of Q2 at time B when Q1 is turned off. Q2 has been in the off state with gate grounded. At the time when Q1 is turned off, load current will commute from Q1 to Q2. As the current in Q2 increases, voltage $V_{CSI}$ with polarity shown in FIG. 4(d) is induced on the common source inductance. The voltage in gate loop of Q2 thus charges $V_{GS2}$ to positive value, which tries to turn Q2 on. If this voltage is high enough and long enough, Q2 will be turned on automatically and the deadtime is minimized.

From the foregoing discussion, it may be understood that when the high side MOSFET is turning on, common source inductance will help drive the low side MOSFET into the off state and when the high side MOSFET is turning off, common source inductance will try to turn the low side MOSFET on without any delay. This yields the benefits referred to above. These benefits of these effects will now be described in more detail.

Figure 5A:
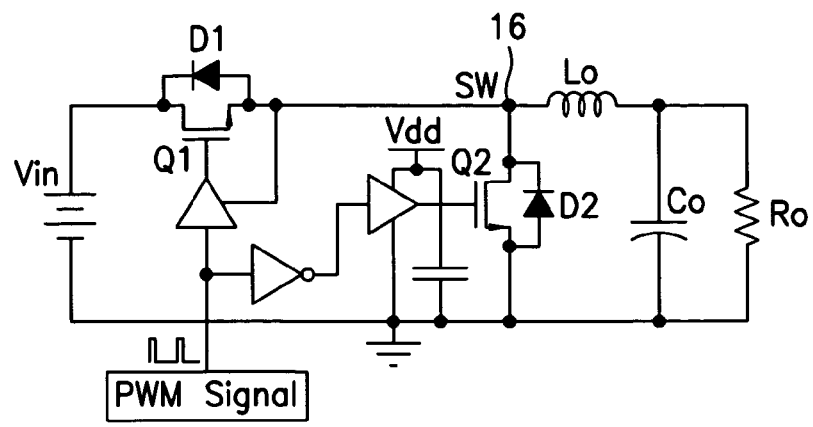
FIG. 5(a) shows a circuit without significant common source inductance which is subject to high power loss due to shoot-through current.
Figure 5B:
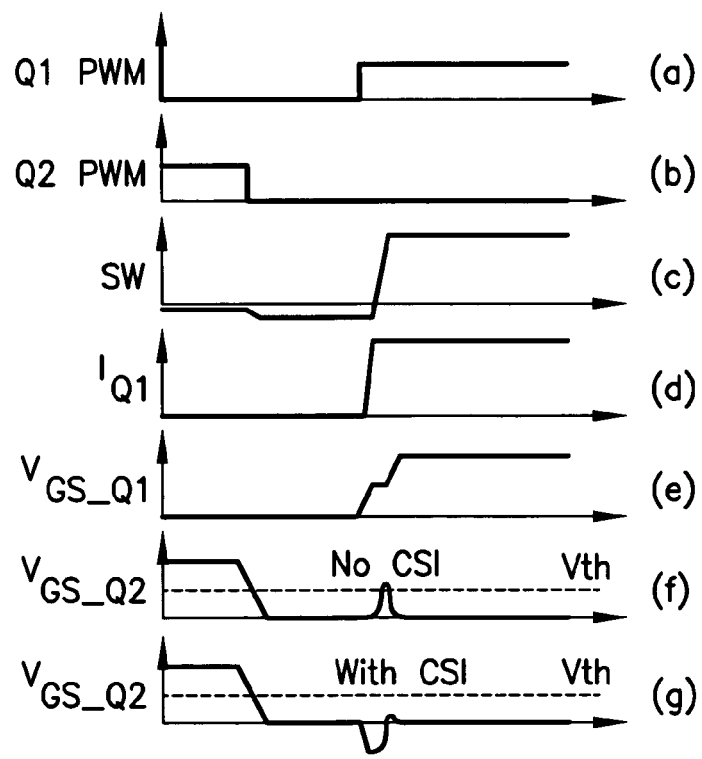
FIG. 5(b) shows various voltage and current waveforms in the circuit of FIG. 5(a), and the effect on the gate voltage of the low side MOSFET with and without common source inductance.

Cdv/dt Immunity:

Referring now to FIG. 5(a), it is known to those skilled in the art that even if there is essentially no common source inductance, high dv/dt on the switching node 16 between the high and low side MOSFETS Q1 and Q2 when high side MOSFET Q1 turns on may cause false turn on of low side MOSFET Q2, and cause high power loss due to shoot-through current. When common source inductance in the low side MOSFET circuit is allowed to exist, this problem can be solved as shown in FIG. 5(b).

When high side MOSFET Q1 turns on, the load current commutes from low side MOSFET body diode D2 to the Q1 branch. During this transition, $V_{GS}$ of MOSFET Q2 goes to a negative value which depends on the common source inductance and the load current. After the current transition, the switching node 16 begins to rise with high dv/dt. This dv/dt introduces a charging current to the gate of Q2 through its Miller capacitor $C_{GD}$ (see FIG. 4(c)). Since the Q2 gate voltage has previously been offset by a negative value, even with Cdv/dt effect, the gate voltage of Q2 will not rise high enough to reach its threshold. Waveforms (a)-(e) show various voltages and current in the circuit of FIG. 5(a) under the conditions described above. Waveforms (f) and (g) show the effect on the gate voltage of MOSFET Q2 with and without intentionally provided common source inductance.

Simulations performed using an International Rectifier type IRF6618 MOSFET as a low side MOSFET in a typical buck converter circuit, the total power loss of a 1 $MH_Z$, 12V to 1.2V converter is reduced from 6.04 W to 5.62 W by using 2.5 nH common source inductance.

Another benefit is that without the need for concern about Cdv/dt turn on, the low side MOSFET can be designed with lower $V_t$ and $R_{dson}$. This can further reduce power loss.

Shoot Through Prevention and Deadtime Reduction:

From the previous discussion, it will be understood by those skilled in the art that the common source inductance automatically turns off the low side MOSFET when the high side MOSFET is turning on. Conversely, when the high side MOSFET is turning off, the low side MOSFET is automatically turned on by the common source inductance. Thus, even there is a short overlap between the high and low side gate drive signals, the common source inductance generates a voltage which turns off the low side MOSFET and prevents shoot through.

Some deadtime is needed to prevent shoot through. During the deadtime, however, the body diode of the low side MOSFET is conducting. Since the body diode has a high forward voltage drop, the power loss is correspondingly high. For a 1 MHz switching frequency, deadtime loss is almost ⅓ of total low side MOSFET loss. As the switching frequency goes higher, and Rds becomes lower, body diode loss is even more serious. The ability to significantly reduce deadtime by taking advantage of common source inductance in the low side MOSFET current path is a significant advantage.

Simulation studies were conducted using an International Rectifier IRF6618 MOSFET on the low side in a synchronous buck converter. With common source inductance of 2.5 nH, the total power loss of a 500 kHz, 12V to 1.2V converter was reduced from 5.26 W to 4.78 W. This is due to reduced deadtime alone, since the IRF6618 MOSFET itself exhibits no Cdv/dt problem.

Since studies which have been performed indicate that common source inductance values in the range of only 2 to 3 nH are needed to achieve the performance benefits according to the invention, these values can be implemented with on-board parasitics, which include packaging inductance and trace inductance. By careful layout, e.g. by extending conductive traces between the source terminal of the synchronous MOSFET and the low-side rail, which is also the return point of the gate drive path use of extra magnetic components can be avoided.

As known by those skilled in the art, it is generally desirable that the low side MOSFET in a synchronous rectifier circuit exhibit a low value of $R_{dson}$ This requires that the device have a large silicon area and high gate charge. Turn on and off speed is normally slow. With common source inductance in the circuit, more gate overdrive is provided to turn the low side MOSFET on and off, thus potentially reducing the turn-on and turn-off time.

Figure 6:
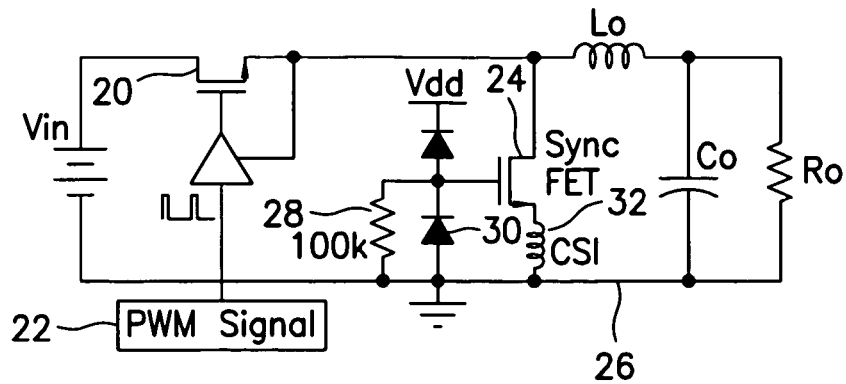
FIG. 6 illustrates a buck converter having a self-driven low side MOSFET according to the invention.

Self-driven Synchronous BUCK Converter:

Since the presence of common source inductance can help turn the low side MOSFET on and off, it is possible design a buck converter in which the low side MOSFET is self-driven. A suitable circuit is illustrated in FIG. 6. Here, gate drive for the high side MOSFET 20 is provided in a conventional manner by a PWM gate driver circuit 22, but the gate of low side MOSFET 24 is connected to the low side rail 26 by a resistor 28 in parallel with a diode 30.

During turn on of high side MOSFET 20, the common source inductance 32 turns off low side MOSFET 24 automatically, and the inherent $C_{gs}$ holds the gate voltage until turn-off of high side MOSFET 20. At that time, the load current charges the gate of low side MOSFET 24 and turns it on through common source inductance 32. The gate charge energy is effectively recycled between $V_{gs}$ and $L_{csi}$. This can result in a simple gate driver circuit with optimal deadtime control.

Figure 7A:
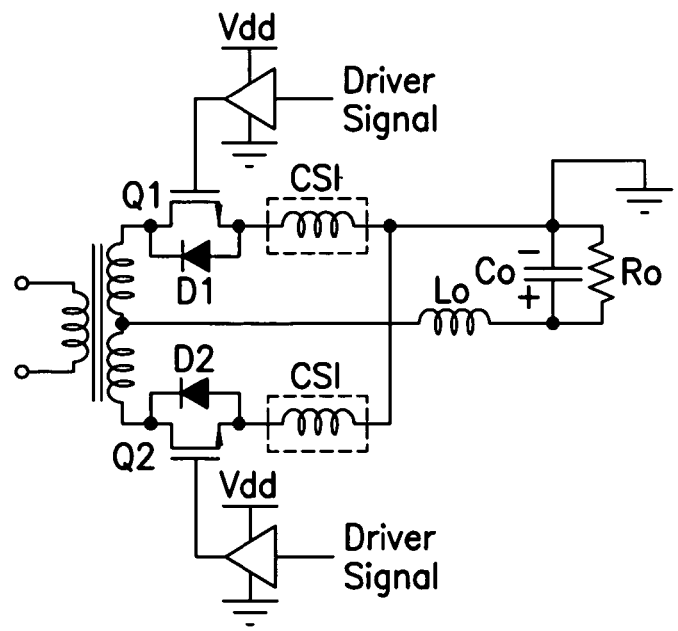
FIGS. 7(a) through 7(c) illustrate isolated synchronous rectifier circuits designed according to the invention.
Figure 7B:
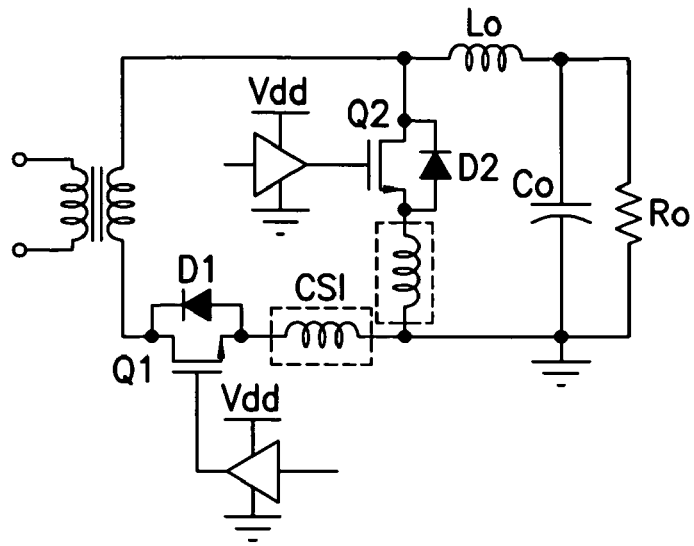
Figure 7C:
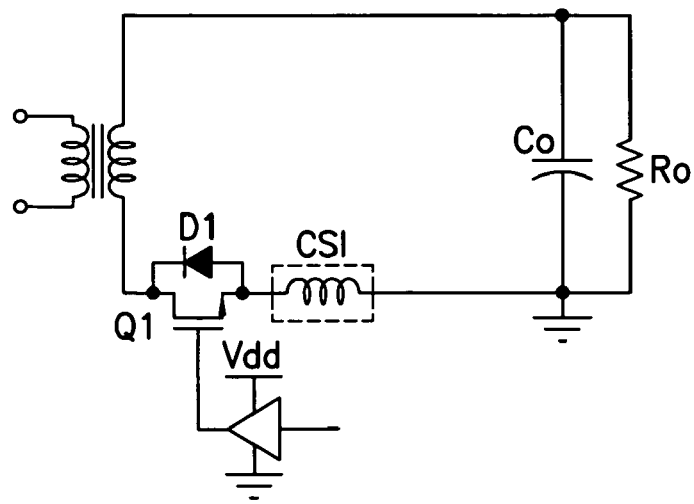

Generally speaking, successful implementation in its various aspects requires that the MOSFET be designed so that its gate resistance is very low to allow fast build up of the charging current. This can be done by utilizing advanced power MOSFET technology such as salicided gate construction, and proper packaging. Use of other transistors requires similar low control terminal resistance Also, as will be understood by those skilled in the art, with a larger synchronous MOSFET, Cgs will be bigger, and more energy will be needed to charge Cgs to a desired gate voltage. This will require more common source inductance. At the same time, with higher load current, more energy can be provided with less common source inductance. The amount of common source inductance thus needs to be determined according to the Cgs and load current Extension of the Concept:

The above analysis used synchronous buck converter as examples. However, the concept of the invention can be extended to all synchronous rectifier topologies. Three embodiments of isolated synchronous rectifier circuits which take advantage of increased common source inductance in the synchronous MOSFET current paths are illustrated in FIG. 7(a) which shows a circuit having bridge topology, in 7(b), which shows a circuit having forward topology, and in FIG. 7(c) which shows a circuit having flyback topology.

The operation of these circuits are essentially conventional except for the performance improvements achieved through utilization of the common source inductance as described herein.

Although the present invention has been described in relation to particular embodiments thereof, many other variations and modifications and other uses will become apparent to those skilled in the art. It is intended, therefore, that the invention not be limited not by the specific disclosure herein, but that it be given the full scope permitted according to the appended claims.

What is claimed is:

1. A synchronous rectifier circuit including a switching transistor, a synchronous transistor, and an operatively effective inductance in the current path of the synchronous transistor, wherein the operatively effective inductance is shared with the control circuit path for the transistor; wherein
    the synchronous transistor is a MOSFET and the inductance is a common source inductance shared by the source-drain power path and a gate driver circuit loop;
    wherein a gate drive for the synchronous MOSFET is provided by voltage induced across the common source inductance by current which flows through the common source inductance when the switching transistor is turned off and on; and
    wherein a value of the common source inductance is set by selecting the synchronous transistor to provide the common source inductance as a parasitic inductance of the synchronous transistor such that when the switching transistor is turned ON, the common source inductance drives the synchronous MOSFET OFF at an increased rate and when the switching transistor is OFF, the common source inductance drives the synchronous MOSFET ON at an increased rate.

2. A synchronous rectifier circuit according to claim 1, wherein the inductance is purely parasitic.

3. A synchronous rectifier circuit according to claim 1, wherein both transistors are MOSFETS and the inductance is purely parasitic common source inductance.

4. A synchronous rectifier circuit according to claim 3, wherein the common source inductance is in the range of about 2 nH to about 3 nH.

5. A synchronous rectifier circuit according to claim 1, wherein both transistors are MOSFETS and the synchronous MOSFET exhibits a low value of gate resistance.

6. A synchronous rectifier circuit according to claim 1, wherein the circuit is a buck converter in which the switching and synchronous transistors are MOSFETS.

7. A synchronous rectifier circuit according to claim 6, wherein the synchronous MOSFET exhibits a low value of gate resistance.

8. A synchronous rectifier circuit according to claim 7, further including a pulse width modulation gate drive circuit for only the switching MOSFET.

9. A synchronous rectifier circuit according to claim 1, wherein the synchronous transistor exhibits a low value of resistance to a control signal at a control terminal thereof.

10. A synchronous rectifier circuit according to claim 9, further including a pulse width modulation gate drive circuit for only the switching transistor.

11. A synchronous rectifier circuit according to claim 1, further including an isolation transformer with at least one synchronous transistor connected in a series circuit with a secondary winding of the isolation transformer.

12. A synchronous rectifier circuit according to claim 11, wherein the secondary winding is center tapped to provide an output for a load device through a circuit comprised of an output inductor and an output capacitor, and including two synchronous transistors connected in series, each with a respective operatively effective inductance in its current path, across the secondary winding.

13. A synchronous rectifier circuit according to claim 11, further comprising two branches connected in series across the secondary winding, each branch including a synchronous transistor with a respective operatively effective inductance in its current path.

14. A method of improving the operation of a synchronous rectifier circuit which includes a switching transistor and a synchronous transistor, the method comprising the steps of:

providing an operatively effective value of inductance shared by the current path of the synchronous transistor and its control terminal circuit path; and selecting a synchronous transistor, wherein the synchronous transistor is a MOSFET and the inductance provided is purely a parasitic common source inductance wherein the step of selecting comprises selecting a MOSFET as the synchronous transistor such that the operatively effective value of inductance is set such that when the switching transistor is turned ON, the inductance drives the synchronous MOSFET OFF at an increased rate and when the switching transistor is OFF, the inductance drives the synchronous MOSFET ON at an increased rate.

15. A method according to claim 14, wherein both transistors are MOSFETS.

16. A method according to claim 15, wherein the common source inductance is in the range of about 2 nH to about 3 nH.

17. A synchronous rectifier circuit according to claim 14, wherein both transistors are MOSFETS and the synchronous MOSFET exhibits a low value of gate resistance.

* * * * *